United States Patent

[11] 3,627,786

| [72] | Inventors | Georges Gobron;<br>Marcel Repper, both of Melle, Deux-Sevres, France |
|---|---|---|
| [21] | Appl. No. | 838,548 |
| [22] | Filed | July 2, 1969 |
| [45] | Patented | Dec. 14, 1971 |
| [32] | Priority | Aug. 2, 1968 |
| [33] | | France |
| [31] | | 491 |

[54] CONTINUOUS PRODUCTION OF PARALDEHYDE
10 Claims, 1 Drawing Fig.

| [52] | U.S. Cl. | 260/340 |
|---|---|---|
| [51] | Int. Cl. | C07d 19/00 |
| [50] | Field of Search | 260/340 |

[56] References Cited
UNITED STATES PATENTS

| 2,318,341 | 5/1943 | Thompson | 260/340 |
|---|---|---|---|
| 2,479,559 | 8/1949 | Dolnick et al. | 260/340 |
| 2,571,759 | 10/1951 | Quinn et al. | 260/340 |
| 2,980,731 | 4/1961 | Alheritiere et al. | 260/488 |

*Primary Examiner*—Norma S. Milestone
*Attorney*—McDougall, Hersh, Scott & Ladd

ABSTRACT: This invention relates to a method of producing paraldehyde from acetaldehyde by passing a liquid feed stream of acetaldehyde through a reaction zone, the feed stream serving to maintain the solid catalyst in a highly dispersed and fluidized state.

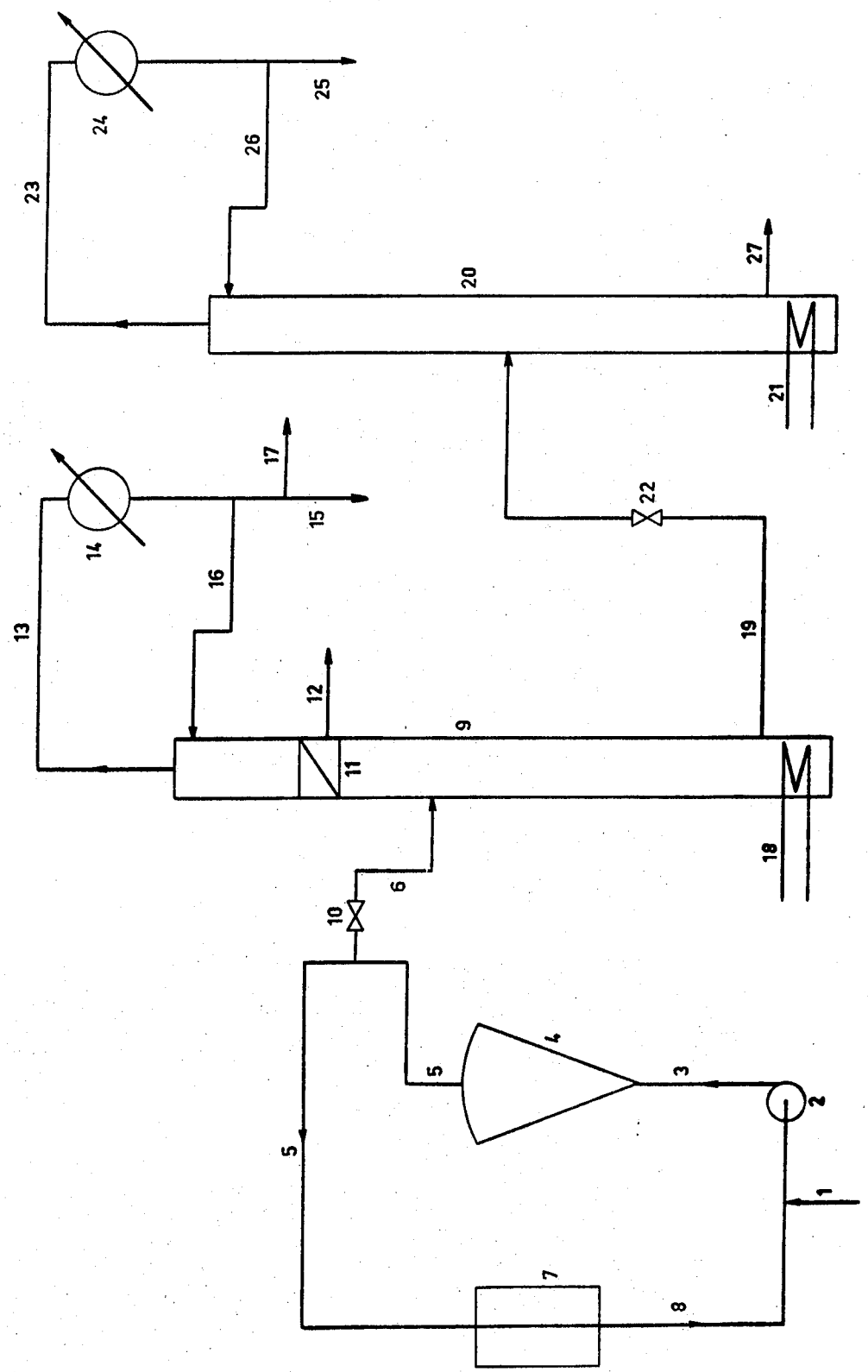

CONTINUOUS PRODUCTION OF PARALDEHYDE

The present invention relates to a process for the manufacture of paraldehyde by polymerization (trimerization) of acetaldehyde.

It has already been proposed, for example, in U.S. Pat. No. 2,479,559, to polymerize acetaldehyde to paraldehyde simply by passing it through a fixed bed of acidic cation exchanger (cation exchange resin) and then directly to a column to distill the reaction mixture. Such a procedure involves serious disadvantages because the highly exothermic nature of the reaction severely limits the size of the reactor. In the attempt to avoid hotspots within such a fixed-bed catalytic reactor, use has been made of reactors provided with a cooling jacket. Even with such an expedient, the catalyst mass is temperature controlled only near the walls of the reactor which are contiguous to or near the coolant circulated through the jacket. For this reason, the process of the above-mentioned patent contemplates the use of reaction tubes which only a few dozen cubic centimeters of acetaldehyde per hour can be circulated therethrough. Thus, the process of this patent cannot practicably be practiced on a commercial scale.

It is an object of the present invention to avoid the aforementioned disadvantages of the prior art and provide a process in which the temperature can be uniformly controlled throughout the catalytic mass. It is yet another object of the present invention to provide a process which is capable of operating with very high yields in reactors of large size for big outputs of paraldehyde.

In accordance with the present invention, the process is carried out by continuously passing a feed stream of liquid acetaldehyde through a vertically disposed reactor in which the catalyst, which is preferably a cation exchange sulfonic resin, is maintained in a highly dispersed and fluidized state in and by the stream of acetaldehyde passing upwards through the reactor. The reactor has a configuration such that the cross-sectional area of the reaction zone gradually or suddenly increases toward the upper portion of the reaction zone so that as the liquid stream passes through the reaction zone, a decrease is experienced in the linear velocity of the liquid stream. Such a reduction in the velocity of the stream serves to minimize the tendency of the solid catalyst to remain entrained for removal from the top of the reactor with the liquid effluent.

Reactors suitable for use in the present process may have the shape of an inverted cone or frustum, and are more fully described in French Pat. No. 1,169,924, British Pat. No. 885,088 or U.S. Pat. No. 2,980,731.

It is preferred that only a small portion, from 1 to 15 percent by volume, of the liquid effluent be withdrawn from the reactor system or circuit, the remainder being continuously recycled to the bottom of the reactor with sufficient acetaldehyde corresponding to the amount of effluent removed. It is particularly preferred to withdraw 1—5 percent of the reactor effluent and recycle the remainder with a fresh amount of acetaldehyde feed corresponding to the amount of the reactor effluent withdrawn from the system.

Catalysts suitable for use in the present process are well known to those skilled in the art and are generally cation exchange resins of the polystyrene sulfonic type, such as Allassion CS, Amberlite IR 120, Dowex 50, Duolite C20, Duolite C25, Lewatit S100 or Lewatit S115 in their "hydrogen" or acid forms.

The use of the catalyst in a highly dispersed and fluidized state in the reaction medium or mixture results in equalization of the temperature throughout the medium. The recycle of a large portion of the liquid leaving the reactor also enters into such equalization by permitting easy removal of a large amount of heat (100 kilocalories per kilogram of acetaldehyde) liberated by the reaction and absorbed, in part, by the liquid effluent. Because of the recycle, the mixture which passes through the reactor is rich in paralydehyde, which serves as a diluent for the acetaldehyde to be converted. Using this recycle, it is possible to reach equilibrium with a low conversion rate through the reactor and to control the evolution of the exothermic heat of reaction without high refrigeration costs. Moreover, the productivity of the catalyst is significantly enchanced because it does not lose any significant amount of its activity. It has been found that plants can operate for quite some time without having to replace the catalyst by reason of low catalytic activity.

In accordance with one particular embodiment of the invention, it is possible to operate the process in the presence of a small amount of water preferably, 1–5 percent by weight. The water serves as a brake for the catalytic activity of the ion exchanger and also favors formation of paraldehyde at the expense of undesirable high-boiling byproducts.

The operation is carried out within a general temperature range of 25°–45° C. and preferably within the range of 30°–40° C. It has been found that the latter range yields very good results while minimizing cost of refrigeration. The reactor is preferably operated under a slight positive pressure in the range of 1–3 kilograms per square centimeters to minimize boiling of the acetaldehyde feed.

The reaction mixture withdrawn from the reactor contains paraldehyde, unconverted acetaldehyde, high- and low-boiling byproducts and water, in the event that water is embodied in the acetaldehyde feed stream. It has been found that, in the process of the present invention in which local temperature or hotspots in the catalytic mass are avoided, extremely low amounts of such high-boiling byproducts are produced, even when large reactors are employed.

The reaction mixture may be subjected to distillation, in accordance with techniques known to those skilled in the art, to separate the unconverted acetaldehyde, which can be recycled to the reactor, and low-boiling byproducts and impurities which can be discarded. The remaining mixture of paraldehyde and high-boiling byproducts is subjected to rectification, preferably under a vacuum to recover substantially pure paraldehyde.

If water is present in the acetaldehyde feed stream, it may be withdrawn from the middle of the distillation column used to separate acetaldehyde and low-boiling byproducts from paraldehyde and high-boiling products. It has been found that best results are obtained if the distillation column is operated at atmospheric pressure. It has also been found suitable to withdraw water as a lower layer in a decantation operation performed in the distillation column itself. For best results, the decantation operation is performed in a zone in the distillation column where the water paraldehyde heterogeneous azeotropic mixture is present. There is a distinct advantage in conducting the decantation operation on the hot azeotropic mixture because paraldehyde is less soluble in hot water than in cold. Therefore, the decantation operation may be carried out externally of the column, if desired, by using an external heat supply to provide a hot water-paraldehyde azeotrope.

A substantially quantitative distillation yield can be obtained by carrying out the rectification of the raw paraldehyde in a second column under an absolute pressure which does not exceed 200 mm. of mercury, and preferably at 100 mm. mercury or less. Such low pressures favor the stability of the paraldehyde and also assist in avoiding the formation of additional amounts of higher boiling byproducts.

Reference is now made to the schematic drawing which is intended to be illustrative, and is not to be construed as limiting, of one embodiment of the apparatus suitable for carrying out the process of the present invention.

The acetaldehyde feed stream is continuously fed through line 1 upstream of pump 2 which serves to circulate the reaction mixture through the reaction circuit. The reaction circuit or system generally comprises pump 2, line 3 through which the mixture of acetaldehyde feed and recycled liquid is passed to conical reactor 4. The conical reactor 4 contains the cation exchange resin which is maintained in a highly dispersed and fluidized state by the feed stream 3 passing through the reactor. The reaction products leave reactor 4 by way of line 5. Part of the reaction mixture is withdrawn from the system through line 6 while the remainder is recycled to pump 2 by means of line 8 after having passed through cooler 7. By means of this cooler, temperature stability of the reactor system is considerably enhanced as a portion of the heat of reaction is thereby removed. The reactor effluent withdrawn from the reactor circuit through line 6 is introduced to the middle portion of a first distillation column designated as 9. It is preferred that column 9 be operated at or near atmospheric pressure. If the reaction circuit is maintained under pressure, then it is necessary to insert a pressure release valve 10 in line 6 to the distillation column to avoid loss of pressure in the reaction circuit. The upper portion of column 9 is provided with a decanting plate 11 from which water may be withdrawn through line 12. It is at this plate that the water-paraldehyde azeotrope mixture is decanted, and the water separated as the lower layer.

The acetaldehyde vapors are withdrawn from the top of the column 9 through line 13, liquified in condenser 14 and refluxed in part to the top of column 9 through line 16. The remaining portion of the acetaldehyde condensed in condenser 14 is removed through line 15 for recycle to the reactor circuit. Low-boiling impurities and byproducts are withdrawn from the top of the column along with the acetaldehyde. The main impurity in this stream is acetone which is frequently found as an impurity in the acetaldehyde feed. Also contained in the effluent from column 9 is diethyl ether which is present as a low-boiling byproduct. In order to remove such low-boiling substances, it has been found convenient to withdraw them from column 9 through line 17 to thereby avoid buildup of these impurities in the distillation column. Distillation column 9 is heated by conventional heating means depicted in the drawing as 18.

The raw paraldehyde is withdrawn from the lower portion of distillation column 9 through line 19 and is fed to a second distillation column 20. It is in this second distillation column that the paraldehyde is rectified. It has been found desirable to operate column 20 under a vacuum and for this reason a pressure release device 22 is provided in line 19. The paraldehyde vapors are withdrawn from the top of column 20 through line 23 and are liquified in condenser 24. The condensate is partially withdrawn from line 25 and partially refluxed to column 20 through line 26. High-boiling byproducts are withdrawn from the lower portion of column 20 through line 27.

To further illustrate the novel process of the present invention, reference is made to the following examples which describe the process in detail.

EXAMPLE I

The process is generally operated in the apparatus as described in the enclosed drawing. Reactor 4 is provided with 3 liters of exchange resin "Allasion CS" in its hydrogen or acid form. Acetaldehyde containing 0.5 percent by weight acetone, is continuously fed to the reactor at a temperature of 5° C. at the rate of 4 liters per hour. The hourly recycle rate through lines 5 and 8 is 160 liters per hour. Cooler 7 is a plate heat exchanger cooled by means of water at a temperature of 23° C. Under these conditions the temperature of the liquid in line 5 is generally maintained between 40° and 45° C. The acetaldehyde conversion rate is 78 percent, and, after distillation of the reaction products in columns 9 and 20, the paraldehyde final yield is 85 percent with respect to the acetaldehyde converted. During the distillation, column 9 is operated at atmospheric pressure and column 20 is maintained at an absolute pressure of 100 mm. of mercury.

Since the process is carried out without water being present in the acetaldehyde feed, the decanting plate 11 and water withdrawal line 12 remain unused in this particular example.

EXAMPLE II

The process is again carried out in the apparatus described in the figure, and the reactor contains 3 liters of Amberlite IR 120 in its hydrogen or acid form. Acetaldehyde is continuously fed through line 1 to the reactor at a rate of 4 liters per hour and at a temperature of 5° C. The acetaldehyde feed stream contains 0.5 percent by weight acetone and 4 percent by weight of water. The recycle rate amounts to 150 liters per hour and the temperature of the reactor effluent is 40° C.

The acetaldehyde conversion rate is 70 percent and after purification in columns 9 and 20 the paraldehyde yield is 97 percent with respect to the acetaldehyde converted. The low-boiling impurity acetone, and other byproducts together represent 1 percent of the yield and the high-boiling byproducts 2 percent of the yield.

The water contained in the acetaldehyde feed stream is removed from the system for the decanting plate through line 12, as explained hereinabove.

It will be understood that various changes may be made in the details of the apparatus, arrangement and operation of the process without departing from the true spirit of the invention, especially as defined in the following claims.

We claim:

1. In a process for the continuous production of paraldehyde by passing a liquid acetaldehyde feed stream through a catalytic bed of an acid cation exchange resin, the improvement comprising passing a liquid reaction mixture of acetaldehyde containing 1 to 5 percent by weight water to the lower portion of a vertical reaction zone having the shape of an inverted cone or frustum containing the catalytic bed at a rate sufficient to maintain the catalytic bed in a fluidized state, continuously withdrawing liquid reactor effluent, recycling a portion of the liquid reactor effluent and separating the paraldehyde from liquid reactor effluent not recycled.

2. The process as defined in claim 1 wherein only a liquid reactor effluent is subdivided into one portion which is withdrawn and a remaining portion which is recycled to the reactor.

3. The process as defined in claim 2 wherein 1 to 15 percent by volume of the reactor effluent is withdrawn.

4. The process as defined in claim 1 wherein the reaction zone has a temperature in the range of 25°–45° C.

5. The process as defined in claim 1 wherein the reaction zone is maintained at an effective pressure from 1–3 kg./cm$^2$.

6. The process as defined in claim 1 wherein said catalyst is an acid form of a polystyrene sulfonic resin.

7. The process as defined in claim 1 wherein the reactor effluent is in part withdrawn, distilling the withdrawn effluent to remove acetaldehyde and rectifying the remainder to produce purified paraldehyde.

8. The process of claim 7 wherein said rectification is carried out under a vacuum.

9. The process as defined in claim 7 wherein said water is removed from the paraldehyde product by decantation of a hot water-paraldehyde azeotrope.

10. The process as defined in claim 9 wherein said decantation is carried out in a distillation zone for separating acetaldehyde from paraldehyde.

* * * * *

UNITED STATES PATENT OFFICE
CERTIFICATE OF CORRECTION

Patent No. 3,627,786    Dated December 14, 1971

Inventor(s) Georges Gobron et al.

It is certified that error appears in the above-identified patent and that said Letters Patent are hereby corrected as shown below:

In the heading of the patent insert the name of the assignee as follows:

Assignee: Melle-Bezons
Melle, France

Column 1, line 19, after "which" insert --- are only a few millimeters in diameter and through which ---

Signed and sealed this 13th day of June 1972.

(SEAL)
Attest:

EDWARD M. FLETCHER, JR.
Attesting Officer

ROBERT GOTTSCHALK
Commissioner of Patents